US012371917B2

(12) United States Patent
Huang et al.

(10) Patent No.: US 12,371,917 B2
(45) Date of Patent: Jul. 29, 2025

(54) WATER SPRAYING DEVICE AND ABOVE-GROUND POOL

(71) Applicant: BESTWAY INFLATABLES & MATERIAL CORP., Shanghai (CN)

(72) Inventors: Shuiyong Huang, Shanghai (CN); Xianglin Zeng, Shanghai (CN); Qingshui Song, Shanghai (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 0 days.

(21) Appl. No.: 17/830,578

(22) Filed: Jun. 2, 2022

(65) Prior Publication Data

US 2023/0193646 A1 Jun. 22, 2023
US 2024/0318448 A9 Sep. 26, 2024

(30) Foreign Application Priority Data

Dec. 31, 2021 (CN) ......................... 202123437892.6

(51) Int. Cl.
*E04H 4/12* (2006.01)
*E04H 4/00* (2006.01)
(Continued)

(52) U.S. Cl.
CPC ............. *E04H 4/12* (2013.01); *E04H 4/0025* (2013.01); *E04H 4/148* (2013.01); *B05B 17/08* (2013.01)

(58) Field of Classification Search
CPC ........ A61H 2033/021–023; A61H 2201/0126; A61H 33/02–028; A61H 33/087;
(Continued)

(56) References Cited

U.S. PATENT DOCUMENTS 3,247,969 A * 4/1966 Miller ...................... E04H 4/169 366/265
4,225,984 A * 10/1980 Lindsey ............. A61H 33/0087 4/541.3
(Continued)

FOREIGN PATENT DOCUMENTS

DE 202007012249 * 10/2007 ............. B05B 17/08
EP 1219280 3/2002
(Continued)

OTHER PUBLICATIONS

Extended European Search Report dated Dec. 7, 2022 (Dec. 7, 2022) issued on related European patent application 22179265.8 by the European Patent Office.

*Primary Examiner* — David P Angwin
*Assistant Examiner* — Nicholas A Ros
(74) *Attorney, Agent, or Firm* — DICKINSON WRIGHT PLLC

(57) ABSTRACT

A water spraying device and an above-ground pool including the water spraying device are provided. The water spraying device includes: a sprayer assembly having a water inlet end, a water outlet end, and a first magnetic element disposed on the water inlet end; and a mounting assembly including a first end, a second end in fluid communication with the first end, and a second magnetic element disposed on the first end of the mounting assembly. The mounting assembly defines therein a water passage to the sprayer assembly. The first magnetic element is mutually attractive to the second magnetic element such that the water inlet end of the sprayer assembly and the first end of the mounting assembly are detachably connectable via the first magnetic element and the second magnetic element.

14 Claims, 5 Drawing Sheets

(51) Int. Cl.
*E04H 4/14* (2006.01)
*B05B 17/08* (2006.01)

(58) Field of Classification Search
CPC ...... A61H 33/601–6063; A63B 69/125; B05B 1/18–185; B05B 15/65–654; B05B 17/08–085; E03C 1/0401–0402; E03C 1/042; E04H 4/12–1209; E04H 4/14; E04H 4/16; E04H 4/169; F16L 27/04–073
See application file for complete search history.

(56) References Cited

U.S. PATENT DOCUMENTS

| | | | | | |
|---|---|---|---|---|---|
| 4,773,104 | A * | 9/1988 | Wang | A61H 33/6036 4/492 |
| 4,896,384 | A * | 1/1990 | Dijkhuizen | A61H 33/6057 239/524 |
| 6,450,425 | B1 * | 9/2002 | Chen | F16L 27/04 4/615 |
| 8,522,372 | B1 * | 9/2013 | Lafon | B05B 17/08 239/18 |
| 10,077,571 | B2 * | 9/2018 | Hsu | F21S 9/046 |
| 10,882,061 | B2 * | 1/2021 | Nikles | B05B 1/1609 |
| 2011/0216526 | A1 * | 9/2011 | Li | F21V 33/004 362/96 |
| 2012/0042973 | A1 | 2/2012 | Ko | |
| 2017/0014849 | A1 | 1/2017 | Gao et al. | |
| 2019/0194966 | A1 * | 6/2019 | Huang | E04H 4/1218 |

FOREIGN PATENT DOCUMENTS

| | | | | |
|---|---|---|---|---|
| KR | 20190096536 | * | 8/2019 | E04H 4/169 |
| WO | 2016164747 | | 10/2016 | |

* cited by examiner

WATER SPRAYING DEVICE AND ABOVE-GROUND POOL

CROSS-REFERENCE TO RELATED APPLICATION

This application claims priority from Chinese Application CN 202123437892.6, filed Dec. 21, 2021 in China, the disclosure of which is incorporated herein by reference in its entirety.

BACKGROUND

1. Field

Apparatuses and methods consistent with exemplary embodiments relate to a water spraying device for an above-ground pool, and an above-ground pool having the water spraying device.

2. Description of the Related Art

Above-ground pools may be inflatable pools, frame pools, or another type of pool, and are widely used due to convenient installation and good effect of usage. A water spraying device may be mounted on an above-ground pool to spray water into the pool to form a "waterfall", which may be used as a part of water circulation system to circulate the water in the pool, may also provide a massage function.

Such a water spraying device may be fixedly mounted to an inner wall of the pool. On the one hand, since an air chamber of the inflatable pool must remain air-tight, a mounting structure for fastening the water spraying device to the inner wall of an inflatable pool is often complex, and a water supply pipeline of the water spraying device may be difficult to arrange. On the other hand, as time passes, an older inflatable pool may become somewhat deformed, as compared to a new pool, and such deformation may cause a pulling interaction between a mounting structure of a water spraying device and the inner wall of the pool, resulting in that a mounting structure or a pool wall becoming more prone to deformation or damage, and affecting functions of the water spraying device and even threatening the safety of users.

SUMMARY

Example embodiments may address at least the above problems and/or disadvantages and other disadvantages not described above. Also, example embodiments are not required to overcome the disadvantages described above, and may not overcome any of the problems described above.

According to an aspect of an example embodiment, a water spraying device comprises: a sprayer assembly comprising a water inlet end, a water outlet end, and a first magnetic element disposed on the water inlet end; and a mounting assembly comprising a first end, a second end in fluid communication with the first end, and a second magnetic element disposed on the first end of the mounting assembly, wherein the mounting assembly defines therein a water passage to the sprayer assembly; wherein the first magnetic element is mutually attractive to the second magnetic element such that the water inlet end of the sprayer assembly and the first end of the mounting assembly are detachably connectable via the first magnetic element and the second magnetic element.

The mounting assembly may further comprise a mount defining the first end of the mounting assembly, and a spherical connector defining the second end of the mounting assembly and adjustably connected to the mount.

The mount may comprise an arc-shaped connecting portion, the spherical connector comprises a ball head having a spherical section corresponding to the arc-shaped connecting portion on the mount, and a connecting section configured to connect to a water inlet pipe.

The spherical connector may further comprise a nut connected to the mount, the spherical section of the ball head is disposed between the mount and the nut, the nut connectable to the mount by means of threading on the nut and the mount; and the connecting section of the ball head extends out of the nut.

The spherical connector may further comprise a pair of ball bushings disposed between the mount and the nut, such that the pair of ball bushings clamp the spherical section when the nut is attached to the mount.

The mounting assembly may further comprise a mount defining the first end of the mounting assembly, the mount comprising an extension portion extending opposite the first end and defining the second end of the mounting assembly.

The water spraying device may further comprise a seal disposed between the second end of the mounting assembly and the water inlet pipe.

The sprayer assembly may further comprise a shell defining a water spraying passage therein, wherein the water inlet end of the sprayer assembly and the water outlet end of the sprayer assembly are in fluid communication through the water spraying passage; wherein the water inlet of the sprayer assembly comprises an opening penetrating the shell, and the water supply passage and the water inlet end are in fluid communication through the opening; wherein the water outlet end comprises a nozzle having a size which decreases toward an outlet end thereof.

The shell may comprise a first shell and a second shell attached to each other, the nozzle is defined by at least one of the first shell and the second shell, and the nozzle is moveable.

The sprayer assembly may further comprise a light-emitting assembly disposed on at least one of a top surface and a bottom surface of the nozzle.

According to an aspect of another example embodiment, an above-ground pool may comprise: a pool bottom and a pool wall surrounding the pool bottom to define a water carrying area, and a water spraying device as described above.

The pool wall may comprise an inner wall and an outer wall defining a closed inflatable chamber therebetween, and a bushing formed through the inflatable chamber and hermetically connected to the inner wall and the outer wall.

BRIEF DESCRIPTION OF THE DRAWINGS

The above and/or other aspects will become apparent and more readily appreciated from the following description of example embodiments, taken in conjunction with the accompanying drawings, in which: Other features and advantages of the present utility model will be better understood through the following optional embodiments described in detail with reference to the accompanying drawings. The same or similar components are identified by the same reference numerals in the accompanying drawings, in which.

DETAILED DESCRIPTION

Figure 1:
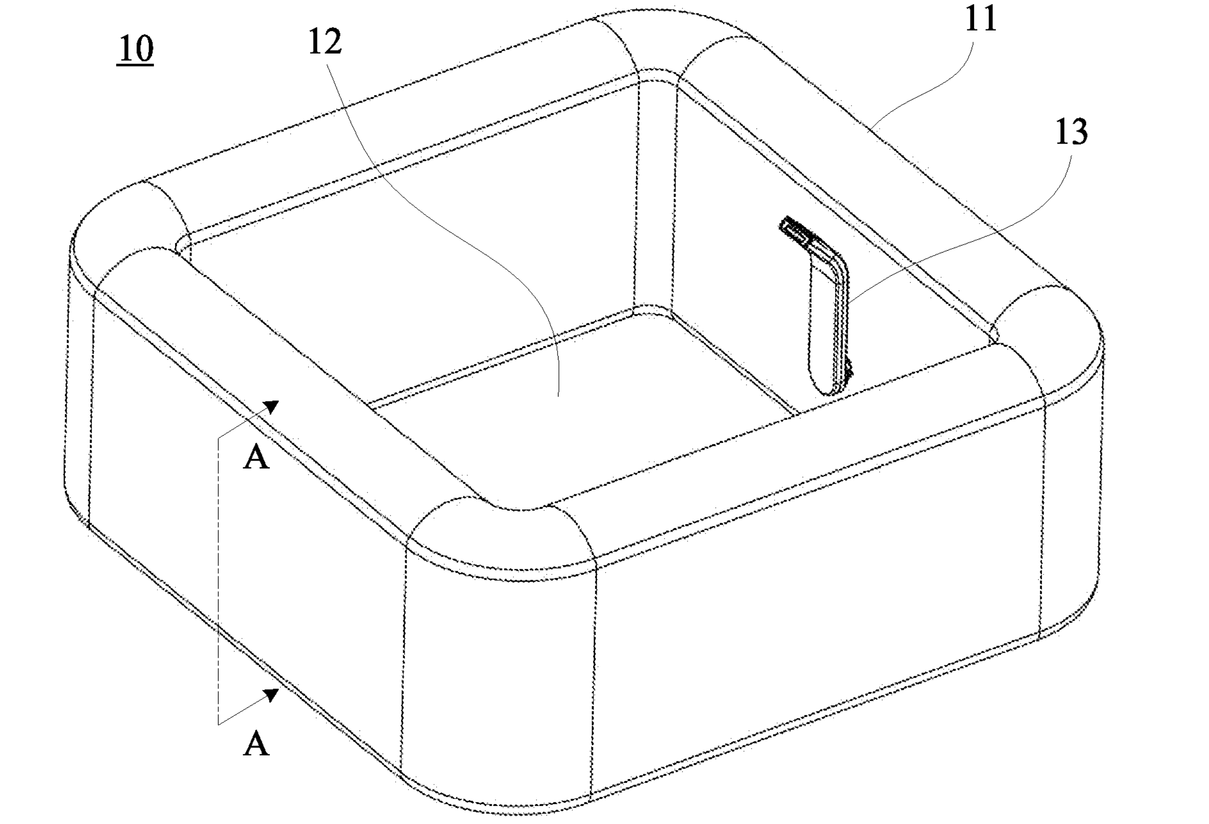
FIG. 1 is a schematic diagram of an above-ground pool and a water spraying device according to an example embodiment.

Reference will now be made in detail to example embodiments which are illustrated in the accompanying drawings, wherein like reference numerals refer to like elements throughout. In this regard, the example embodiments may have different forms and may not be construed as being limited to the descriptions set forth herein.

It will be understood that the terms “include,” “including”, “comprise, and/or “comprising,” when used in this specification, specify the presence of stated features, integers, steps, operations, elements, and/or components, but do not preclude the presence or addition of one or more other features, integers, steps, operations, elements, components, and/or groups thereof.

It will be further understood that, although the terms “first,” “second,” “third,” etc., may be used herein to describe various elements, components, regions, layers and/or sections, these elements, components, regions, layers and/or sections may not be limited by these terms. These terms are only used to distinguish one element, component, region, layer or section from another element, component, region, layer or section.

As used herein, the term “and/or” includes any and all combinations of one or more of the associated listed items. Expressions such as “at least one of,” when preceding a list of elements, modify the entire list of elements and do not modify the individual elements of the list.

Various terms are used to refer to particular system components. Different companies may refer to a component by different names—this document does not intend to distinguish between components that differ in name but not function.

Matters of these example embodiments that are obvious to those of ordinary skill in the technical field to which these exemplary embodiments pertain may not be described here in detail.

Herein, an inflatable pool is illustrated and described as an example of an above-ground pool. However, it should be understood that an above-ground pool as referenced herein may be an inflatable pool, a frame pool, or another type of pool, as would be understood by one of skill in the art. Furthermore, an above-ground pool as referenced herein should not be limited to having a shape shown in the figures, but may be any of a circular pool, an oval pool, a rectangular pool, and another polygonal pool.

Figure 2:
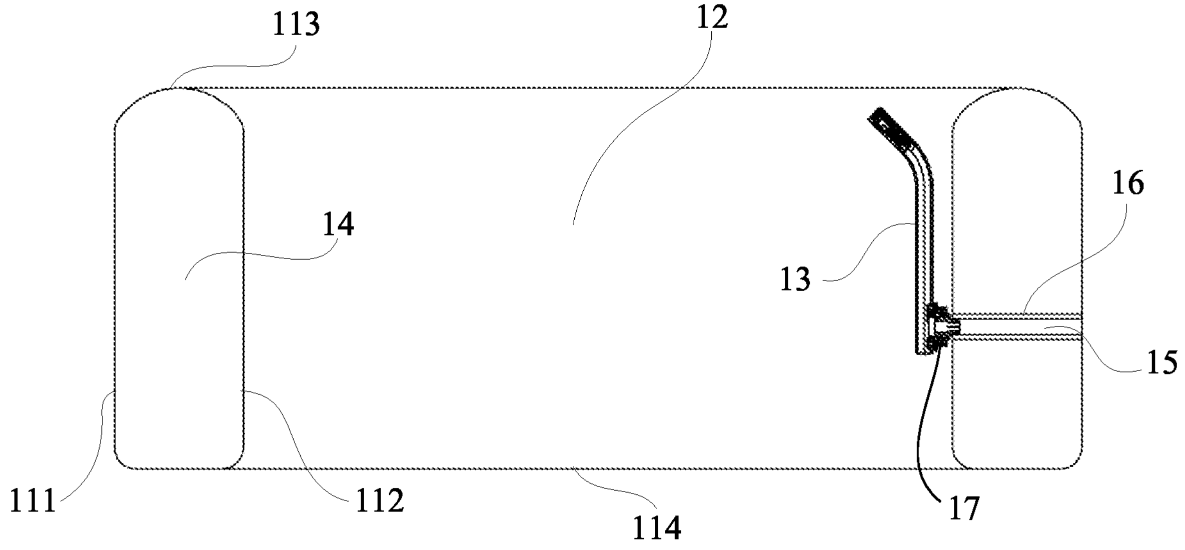
FIG. 2 is a schematic cross-sectional diagram along A-A of the above-ground pool of FIG. 1.

FIG. 1 and FIG. 2 illustrate an example inflatable pool 10. The inflatable pool 10 includes a pool bottom 114 and a pool wall 11 surrounding the pool bottom 114 to define a water carrying area 12. The pool wall 11 includes an outer wall 111 and an inner wall 112. In some embodiments, the outer wall 111 and the inner wall 112 may define a closed inflatable chamber. In the example embodiment illustrated in the figures, the pool wall 11 further includes a top wall 113, wherein the top wall 113, together with the outer wall 111, the inner wall 112, and the pool bottom 114 defines an inflatable chamber 14. The inflatable chamber may be a single air chamber surrounding the pool bottom, or may include multiple air sub-chambers. Such various air sub-chambers may be in fluid communication with one another.

A water spraying device is mounted on the pool wall 11, and is supplied with water through a water inlet pipe penetrating the pool wall. One end of the water inlet pipe is connected to a water pump outside the pool body, and the other end of the water inlet pipe is connected to the water spraying device. The water spraying device guides water through a built-in water channel, and sprays water into the pool from a nozzle, such that the water may form a waterfall effect. As shown in this example embodiment, the water inlet pipe 15 penetrates the outer wall 111 and the inner wall 112 of the pool wall 11, and is sealed with the outer wall 111 and the inner wall 112. According to an example aspect, in order to ensure an air-tightness of the air chamber, and to facilitate installation of the water inlet pipe and installation of the water spraying device at an end portion of the water inlet pipe, the water inlet pipe 15 may traverse a bushing 16 to be made to be in communication with a water pump outside the pool body and with a water spraying device inside the pool body. Such a bushing 16 may be hermetically connected to the inner wall 112 and to the outer wall 111 of the pool wall 11, respectively.

The water spraying device may be mounted on an inner side of the pool wall 11, with a water inlet at a lower end and a water outlet at an upper end, so that water is sprayed into the pool in the form of a parabola to achieve a good water spray effect. That is, a mounting point of the water spraying device may be located at a lower end of the water spraying device. FIGS. 3A to 3D illustrate a water spraying device according to a first example embodiment. With reference to FIG. 2, the water spraying device includes a sprayer assembly 13 and a mounting assembly 17. The sprayer assembly 13 has a water inlet end 132 and a water outlet end 133, and the water outlet end 133 is configured to be higher than the water inlet end 132. The mounting assembly 17 is provided with a water supply passage for the sprayer assembly 13, and is suitable to be connected to the water inlet pipe 15 and connected to the water inlet end 132 of the sprayer assembly 13.

Figure 3A:
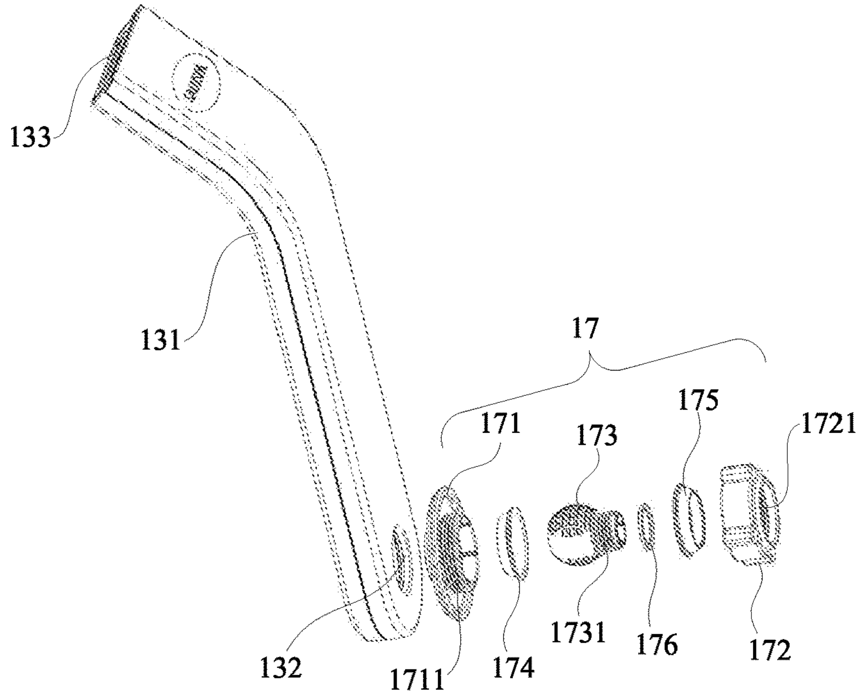
FIG. 3A is an exploded schematic diagram of a water spraying device according to a first example embodiment.
Figure 3B:
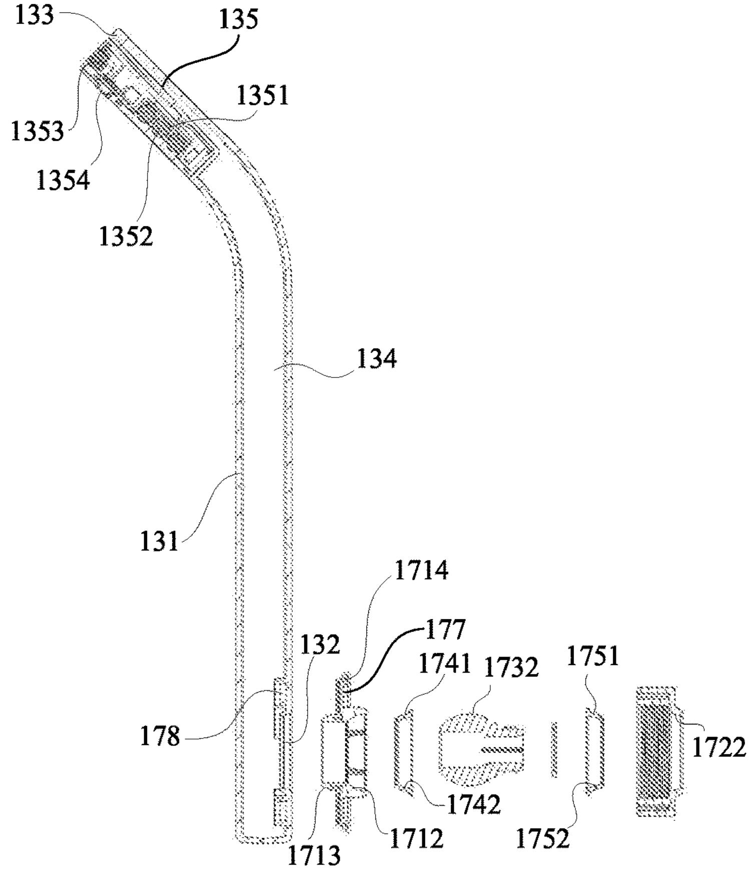
FIG. 3B is a schematic cross-sectional diagram of the water spraying device of FIG. 3A.
Figure 3C:
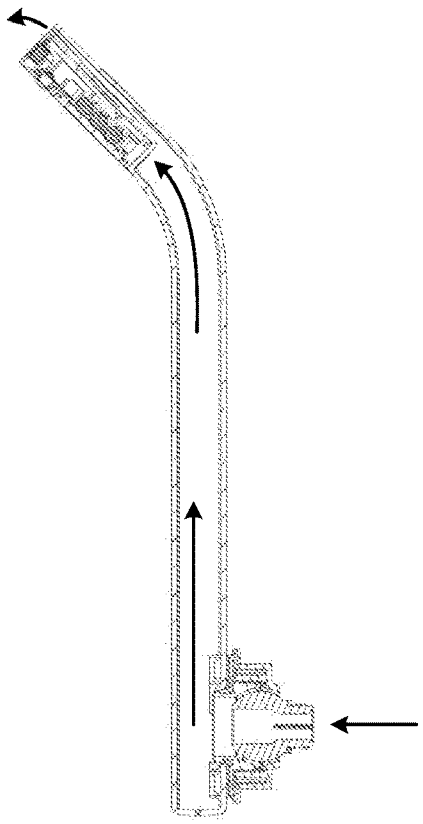
FIG. 3C is a schematic cross-sectional diagram of the water spraying device of FIG. 3B, in an assembled state.
Figure 3D:
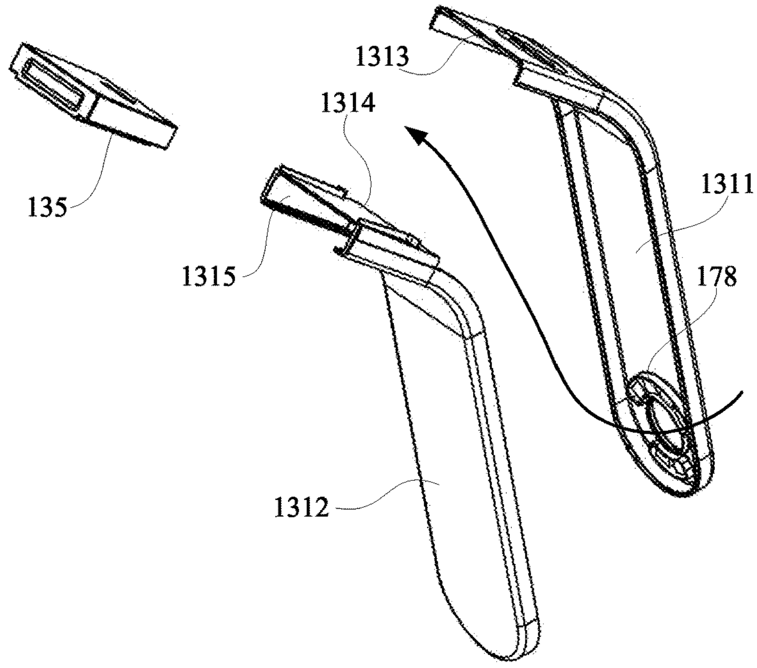
FIG. 3D is an exploded schematic diagram of a sprayer assembly of the water spraying device of FIG. 3A.

According to one or more example aspects, and as shown in FIGS. 3A-3D, the sprayer assembly 13 includes a shell 131 defining a cavity 134 therein which defines a water spraying passage. The water inlet end 132 is provided with an opening which penetrates the shell 131 and is connectable to the mounting assembly 17, and the water outlet end 133 is provided with a nozzle having a size that is reduced gradually toward an outlet, as shown in FIG. 3B. The shell 131 may include a first shell 1311 and a second shell 1312 attached to each other, as shown in FIG. 3D. When the first shell 1311 is attached to the second shell 1312, an integrated nozzle 1313 is formed at the outlet of the shell, the shell being constructed such that the nozzle 1313 is suitable to be bent toward the inside of the pool body, thereby facilitating a waterfall effect.

The sprayer assembly 13 may further a light-emitting assembly 135 arranged at the water outlet end 133. The light-emitting assembly 135 is configured such that light emitted therefrom is directed onto water sprayed from the sprayer assembly 13, to provide an ornamental lighting effect of lighting the sprayed water. The light-emitting assembly 135 is optionally arranged at one of a top surface and a bottom surface of the nozzle. The light-emitting assembly 135 includes, for example, a light-emitting shell 1351, a battery 1352, a light-emitting element 1353 such as an LED, and a switch element 1354 that are accommodated in the light-emitting shell 1351. In the illustrated example embodiment, the light-emitting assembly 135 is disposed on a bottom surface of the nozzle, and correspondingly, the second shell 1312 is provided with snap grooves 1315 at the outlet for accommodating the light-emitting assembly 135. In this manner, as inner surface 1313 at the outlet of the first shell 1311 and an inner surface 1314 at the outlet of the second shell 1312, together, form the nozzle 1313. It should be understood that in one or more example embodiments, in a case in which there are no other components at the outlet end, the shell may also be constructed to have a size gradually reduced toward the outlet, thus directly forming the nozzle. By narrowing the water spraying passage near the outlet, a water flow can be sped up to increase a dynamic pressure of water, thereby improving a massage effect. Moreover, a flat water column may be more attractive. However, according to one or more example embodiments, the nozzle may be constructed as a shower head or any other form, as would be understood by one of skill in the art.

As described above, the sprayer assembly 13 is mounted on an inner side of the pool wall of the above-ground pool through the mounting assembly 17. The water spraying device may be configured to connect to the inner wall of the pool only at the position of the mounting assembly, so as to reduce a connection stress at a joint between the sprayer assembly and the mounting assembly. This allows the sprayer assembly to have degrees of freedom of motion within a certain range relative to the pool wall. When the pool deforms after long-term use and squeezes the sprayer assembly, or the sprayer assembly is impacted by an external force, breaking of a connection position between the water spraying device and the pool is avoided since the sprayer assembly is movable and shiftable, thereby prolonging a service life of the water spraying device, and also making it safer for the user by protecting the user against injury when the water spraying device is accidentally bumped.

There are different ways to reduce the connection stress. In example embodiments shown in FIGS. 3A to 3D, the mounting assembly 17 is configured to include a mount 171 and a spherical connector, wherein the mount 171 constitutes a first end connected to the water inlet end 132 of the sprayer assembly, and has a mounting portion 1713, and the spherical connector constitutes a second end connected to the water inlet pipe, so that the mount 171 is adjustably connected to the water inlet pipe. Specifically, the spherical connector includes a ball head 173, the ball head 173 has a spherical section 1732 matching an arc-shaped connecting portion 1712 on the mount 171 and a connecting section 1731, and the connecting section 1731 is provided with an external thread connected to the water inlet pipe. When the ball head 173 is connected to the water inlet pipe, the spherical section 1732 and the arc-shaped connecting portion 1712 match each other to provide degrees of freedom of motion between the two, to further realize degrees of freedom of motion of the sprayer assembly connected to the mount 171, so that the sprayer assembly can rotate within a certain range, which is conductive to adjusting a water outlet direction.

According to one or more example embodiments, the spherical connector further includes a nut 172 connected to the mount 171 and a pair of ball bushings 174, 175 sandwiched therebetween. The mount 171 is provided with an external thread 1711 matching an internal thread 1721 disposed on the nut 172, the arc-shaped connecting portion 1712 matches an outer camber surface 1741 of the ball bushing 174, and the nut 172 is provided with an arc-shaped portion 1722 that matches an outer camber surface 1751 of the ball bushing 175. In this way, when the ball head 173 is disposed between the pair of ball bushings 174, 175, the ball bushings 174, 175 are disposed between the mount 171 and the nut 172. When mount 171 and the nut 172 have been tightened by screwing, the spherical section 1732 of the ball head 173 can be limited by an inner camber surface 1742 of the ball bushing 174 and an inner camber surface 1752 of the ball bushing 175, and can move relative to the ball bushings 174, 175, that is, can do relative pivoting, and the connecting section 1731 of the ball head 173 can extend out of the nut 172 to be further connected to the water inlet pipe. By means of the nut 172, an operation of connecting the spherical connector and the mount may be convenient and quick, and an effect of screwing to fasten and unscrewing to move can be achieved. It should be understood that, in order to realize the movement of the sprayer assembly, an inner diameter of the nut 172 should be greater than an outer diameter of the water inlet pipe at its joint connected to the connecting section 1731 of the ball head 173. The connecting section 1731 may be sleeved with a seal ring 176 to enhance a sealing performance between the ball head and the water inlet pipe.

According to the example arrangement described above, a connection stress between the mounting assembly and the sprayer assembly may be reduced. That is, if a fixed connection between the water inlet pipe and the ball head 173 is regarded as immovable, the nut 172 and the mount 171 that are fastened to each other and the sprayer assembly 13 that is connected to the mount 171 can be moved relative to the ball head 173. Thus, the sprayer assembly 13 can be adjusted within a certain range, such as left and right, pitch, and other angles, which brings convenience to the user.

According to one or more example embodiments, the mount 171 is fastened to the water inlet end 132 of the sprayer assembly through the mounting portion 1713 by means of, for example, snap joint, or screw connection.

According to one or more example embodiments, the mounting assembly 17 and the sprayer assembly 13 are detachably connected through magnetic elements. The magnetic elements include a first magnetic element 178 arranged at the water inlet end 132 of the sprayer assembly 13, and a second magnetic element 177 arranged at the first end (i.e., the mount 171) of the mounting assembly 17. In this way, the sprayer assembly 13 is provided with the first magnetic element 178 in the shell, the mount 171 may be provided with a flange 1714 extending radially outward, and the second magnetic element 177 is embedded in the flange 1714. The first magnetic element 178 and the second magnetic element 177 attract each other. For example, at least one of the first magnetic element 178 and the second magnetic element 177 is a permanent magnet, and the other one is a ferromagnetic component or is also a permanent magnet. Therefore, after the mounting assembly is fastened to the water inlet pipe, it is only necessary to align and approach the water inlet end 132 of the sprayer assembly and the mounting portion 1713 of the mount 171, then the water inlet end 132 of the sprayer assembly can be connected to the mounting portion 1713 of the mount 171 under an attraction action of the magnetic elements, which not only brings convenience to disassembly and assembly, transportation and storage, but also ensures the connection or protects the safety of the user when the user accidentally bumps the sprayer assembly. This is because, when a collision force is small, the sprayer assembly and the mount may have a displacement to a certain extent but still maintain the connection under the magnetic attraction between the two, and the use of the water spraying device may not be affected. When the collision force is great enough to break the magnetic attraction between the two, the sprayer assembly falls by itself without hurting the user. In some cases, for example, when the user does not need a water spray function and removes the sprayer assembly, or when the sprayer assembly falls due to an impact, water from the water inlet pipe directly enters the pool, thereby avoiding interruption of water circulation, and thus providing more possibilities for the diversified use of the water spraying device.

FIG. 3C and FIG. 3D respectively show water flow directions with arrows. Specifically, water from the water inlet pipe flows from the water inlet end, at the joint between the sprayer assembly and the mount, into the cavity of the sprayer assembly through the ball head, flows upward and flows out of the nozzle at the outlet end of the sprayer assembly. It can also be seen from FIG. 3C that since the flange of the mount has a generally flat surface, when the sprayer assembly is connected to the mount, the surface of the flange fits a surface of the shell of the sprayer assembly to provide a certain degree of sealing, so that there is no need to dispose an additional seal between the sprayer assembly and the mount, and even if there is a small amount of water leakage, leaking water will flow into the pool without causing the loss of water. According to one or more example embodiments, in order to strengthen a sealing between the sprayer assembly and the mount and prevent water leakage from affecting a water spray pressure, an elastic sealing ring that is substantially annular may also be disposed on a contact surface between the mount and the sprayer assembly.

Figure 4:
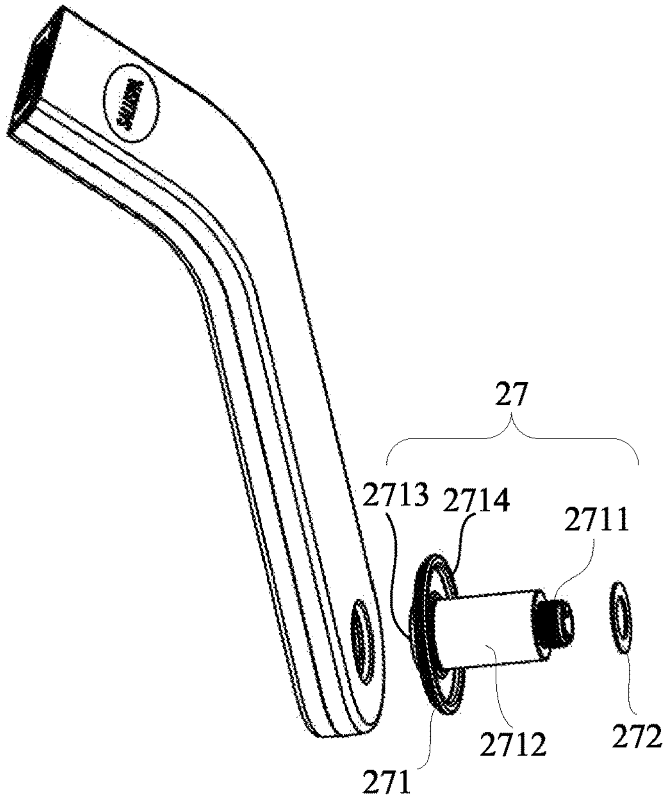
FIG. 4 is an exploded schematic diagram of a water spraying device according to a second example embodiment.

FIG. 4 illustrates a water spraying device of a second example embodiment, which differs from the above example embodiment in the mounting assembly. In this example embodiment, a mounting assembly 27 includes a mount 271. One end of the mount 271 is a mounting portion 2713 connected to the sprayer assembly, and the other end is constructed as an extension portion extending opposite the mounting portion 2713. The spherical connector in the above example embodiment is replaced with an extension portion to be connected to the water inlet pipe. The extension portion may be constructed in the form of a straight pipe 2712, and may have a certain length, such that when the sprayer assembly and the inner side of the pool wall of the pool are spaced apart by a certain distance, so that the pool may not directly squeeze the sprayer assembly after the pool is deformed, and the service life of the water spraying device is prolonged. The straight pipe 2712 and the mount 271 can be integrally formed to simplify a manufacturing process and reduce the cost, or can be formed separately and then connected, for example, by threads. A tail end of the straight pipe is provided with an external thread 2711 connected to the water inlet pipe, and is optionally sleeved with a seal ring 272 to be hermetically connected to the water inlet pipe.

Similarly, in this example embodiment, the mount 271 is provided with a flange 2714 extending radially outward. With magnetic elements respectively disposed in the shell of the sprayer assembly and on the flange, a detachable magnetic connection between the sprayer assembly and the mounting assembly 27 can be achieved.

Figure 5A:
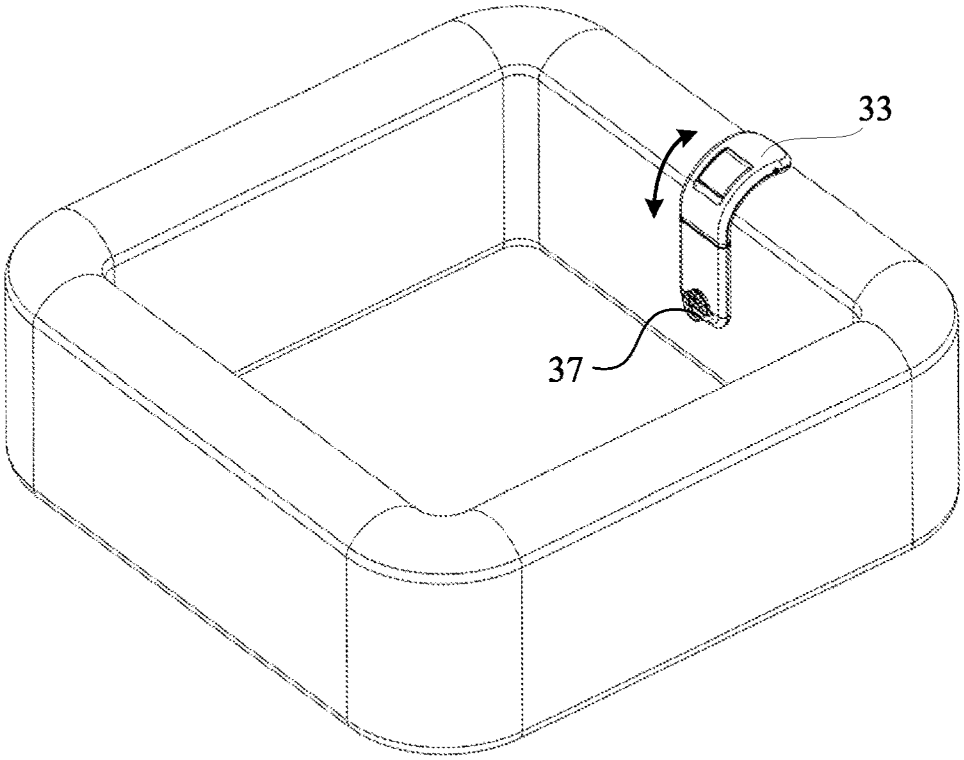
FIG. 5A is a schematic diagram of an above-ground pool according to another example embodiment, illustrating a water spraying device of a third example embodiment.
Figure 5B:
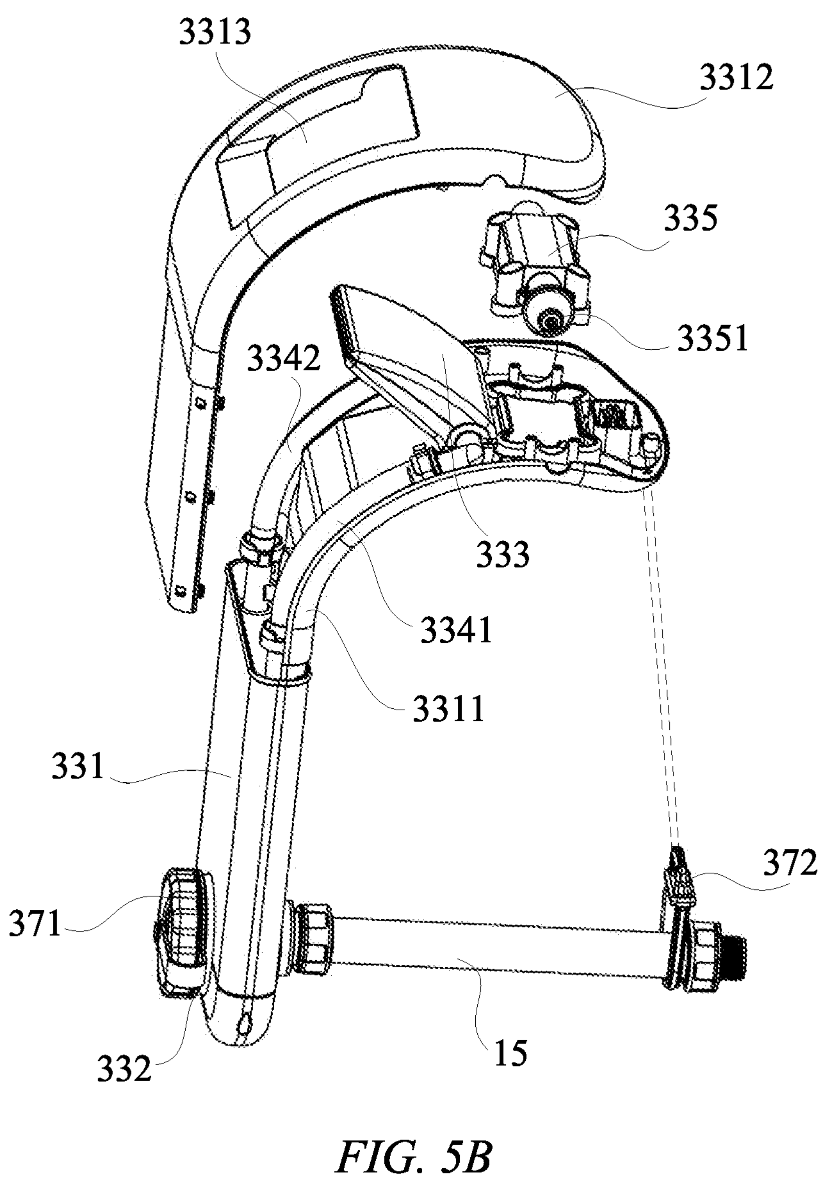
FIG. 5B is an exploded schematic diagram of the water spraying device of FIG. 5A.

FIG. 5A and FIG. 5B illustrate a water spraying device of a third example embodiment. In this example embodiment, a sprayer assembly 33 is still mounted on an inner side of a pool wall via a mounting assembly 37 in a lower-end mounting manner. The differences lie in that the sprayer assembly 33 extends to a top side of the pool wall, and sprays water into the pool through a nozzle that can pivot as indicated by the arrows in FIG. 5A. Referring to FIG. 5B for details, a shell 331 of the sprayer assembly is bent and extends to be suitable for attachment to the top side of the pool wall of the above-ground pool, and is configured to include a first shell 3311 and a second shell 3312 attached to each other, at least one water delivery pipe in communication with the water inlet pipe 15 is disposed between the first shell 3311 and the second shell 3312, for example, two water delivery pipes 3341, 3342 shown in the figure. A nozzle 333 is in communication with the at least one water delivery pipe and is suitable to extend out of a notch disposed on the first shell or the second shell to be directed toward the inside of the pool body of the above-ground pool. That is, the nozzle is configured to be switchable between a first state in which the nozzle is accommodated in the notch and a second state in which the nozzle is directed toward the inside of the pool body. In the illustrated example embodiment, the nozzle 333 is pivotably connected to the first shell 3311 and in communication with the water delivery pipes 3341, 3342, and the second shell 3312 is provided with a notch 3313 from which the nozzle 333 may extend outward. An outer surface of the nozzle 333 may be arranged to match the contour of an outer surface of the second shell 3312 so that the outer surface of the nozzle can be pivoted to be flush with the outer surface of the second shell 3312 when the nozzle is not used and in an accommodated state, as shown in FIG. 5A.

In this example embodiment, a light-emitting assembly 335 of the sprayer assembly can be arranged near a rear of the nozzle 333, and a light-emitting element may be provided close to the rear of the nozzle, as shown in FIG. 5B. Moreover, a switch element 3351 protruding from the shell 331 may be included, for facilitating user operation. The nozzle may include a component made of a transparent material. For example, the nozzle 333 may include a transparent rear plate. Light emitted by the light-emitting element may be injected into water inside the nozzle through the transparent rear plate and transmitted in the water such that the nozzle has a lighting effect when spraying water.

In this example embodiment, the mounting assembly can connect the sprayer assembly to the water inlet pipe according to any one of the above-described example embodiments. That is, the mounting assembly includes a first end (specifically, a mount 371) that is fixedly or detachably connected to a water inlet end 332 of the sprayer assembly, and a second end that is fixedly connected to the water inlet pipe 15. In order to improve the strength and safety in use of the water spraying device, the mounting assembly may further include a pulling component for connecting the water inlet pipe 15 to the sprayer assembly. The pulling component may be arranged in whole or in part on the outer side of the pool wall of the above-ground pool (FIG. 5B illustrates an example of a pulling component 372 arranged entirely on the outer side of the pool wall) to reduce a connection stress at a joint between the sprayer assembly and the mounting assembly. Specifically, referring to FIG. 5B, the pulling component 372 may be a pull fastener, with one end hooking the water inlet pipe 15, and the other end connected to an outer side, extending to the top of the pool wall, of the sprayer assembly through a tensioning string or a tensioning belt (shown as the dotted lines). Thus, on the one hand, the pulling component can reduce the stress generated at the joint between the sprayer assembly and the mounting assembly due to deformation of the pool, thereby avoiding breakage, and on the other hand, it can also hold the sprayer assembly that falls when the joint is broken suddenly, thereby avoiding danger to the user from the broken parts.

It should be understood that the various example embodiments of a sprayer assembly and a mounting assembly described above may be combined in any combination to form water spraying devices in any of various different forms. No matter which example embodiment is used, a water spraying device may improve a safety of a user, while ensuring the pool's normal use, may have a simple structure, may be convenient to operate, may reduce production and maintenance costs of the water spraying device, and may be applicable to any of various above-ground pools.

It may be understood that the exemplary embodiments described herein may be considered in a descriptive sense only and not for purposes of limitation. Descriptions of features or aspects within each exemplary embodiment may be considered as available for other similar features or aspects in other exemplary embodiments.

While exemplary embodiments have been described with reference to the figures, it will be understood by those of ordinary skill in the art that various changes in form and details may be made therein without departing from the spirit and scope as defined by the following claims.

What is claimed is:

1. A water spraying device disposed in an inflatable pool, the inflatable pool comprising an inner wall defining an inflatable chamber, a sleeve at least partially disposed within the inflatable chamber and connected to the inner wall, and a water inlet pipe at least partially traversing the sleeve, the water spraying device comprising:
- a mounting assembly including:
  - a mount including a flange and an arc-shaped connecting portion;
  - a first end defined by the flange of the mount;
  - a spherical connector adjustably connected to the mount, the spherical connector including:
    - a nut connected to the mount by threading; and
    - a ball head having:
      - a spherical section corresponding to the arc-shaped connecting portion of the mount and being held between the mount and the nut; and
      - a connecting section connected to the water inlet pipe and extending out of the nut; and
  - a second end coupled to the water inlet pipe of the inflatable pool; and
  - a first magnetic element disposed on the first end of the mounting assembly; and
- a sprayer assembly comprising a water inlet end in fluid communication with the mounting assembly, a water outlet end and a second magnetic element disposed on the water inlet end;
- wherein the sprayer assembly is magnetically and detachably fixed to the mounting assembly.

2. The water spraying device according to claim 1, wherein the spherical connector further comprises a pair of ball bushings held between the mount and the nut.

3. The water spraying device according to claim 1, wherein the mounting assembly defines a water passage through which the water inlet end of the sprayer assembly is in fluid communication with the water inlet pipe.

4. The water spraying device of claim 1, wherein at least one of the first magnetic element and the second magnetic element is a ferromagnetic component and another of the first magnetic element and the second magnetic element is a permanent magnet.

5. The water spraying device according to claim 1, wherein the sleeve is hermetically sealed to the inner wall of the inflatable pool.

6. The water spraying device according to claim 5, the inflatable pool further comprising an outer wall defining the inflatable chamber together with the inner wall of the inflatable pool;
- wherein the sleeve is further hermetically sealed to the outer wall of the inflatable pool.

7. The water spraying device according to claim 1,
- wherein the sprayer assembly further comprises a shell defining a water spraying passage therein, wherein the water inlet end of the sprayer assembly and the water outlet end of the sprayer assembly are in fluid communication through the water spraying passage;
- wherein the water inlet end of the sprayer assembly comprises an opening penetrating the shell through which the water inlet pipe is in fluid communication with the water spraying passage;
- wherein the water outlet end has an outlet opening narrower than the water spraying passage.

8. The water spraying device according to claim 7, wherein:
- the shell comprises a first shell and a second shell attached to each other,
- a nozzle is defined by at least one of the first shell and the second shell, and
- the nozzle is moveable.

9. The water spraying device according to claim 8, wherein the sprayer assembly further comprises a light-emitting assembly disposed on at least one of a top surface and a bottom surface of the nozzle.

10. An above-ground pool comprising:
- an inner wall defining an inflatable chamber;
- a sleeve at least partially disposed within the inflatable chamber and connected to the inner wall;
- a water inlet pipe at least partially traversing the sleeve; and
- a water spraying device including:
  - a mounting assembly comprising:
    - a mount including a flange and an arc-shaped connecting portion;
    - a first end defined by the flange of the mount;
    - a spherical connector adjustably connected to the mount, the spherical connector including:
      - a nut connected to the mount by threading; and
      - a ball head having:
        - a spherical section corresponding to the arc-shaped connecting portion of the mount and being held between the mount and the nut; and
        - a connecting section connected to the water inlet pipe and extending out of the nut;
    - a second end coupled to the water inlet pipe; and
    - a first magnetic element disposed on the first end of the mounting assembly; and
  - a sprayer assembly comprising a water inlet end in fluid communication with the mounting assembly, a water outlet end and a second magnetic element disposed on the water inlet end;

wherein the sprayer assembly is magnetically and detachably fixed to the mounting assembly.

11. The above-ground pool according to claim 10, wherein the spherical connector defines the second end of the mounting assembly.

12. The above-ground pool according to claim 10, wherein the mounting assembly defines a water passage through which the water inlet end of the sprayer assembly is in fluid communication with the water inlet pipe.

13. The above-ground pool according to claim 10, wherein the sleeve is hermetically sealed to the inner wall of the above-ground pool.

14. The above-ground pool according to claim 13, further comprising an outer wall defining the inflatable chamber together with the inner wall;

wherein the sleeve is further hermetically sealed to the outer wall.

* * * * *